US010076747B2

(12) United States Patent
Geerinck et al.

(10) Patent No.: US 10,076,747 B2
(45) Date of Patent: Sep. 18, 2018

(54) ANATASE POLYMORPH TITANIA-BOUND ZSM-12 ZEOLITE COMPOSITION AND METHOD OF MAKING AND USING SUCH COMPOSITION

(71) Applicant: SHELL OIL COMPANY, Houston, TX (US)

(72) Inventors: Peter Geerinck, Wondelgem (BE); Hermanus Jongkind, Amsterdam (NL); Marcello Stefano Rigutto, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/715,192

(22) Filed: Dec. 14, 2012

(65) Prior Publication Data

US 2013/0153463 A1 Jun. 20, 2013

Related U.S. Application Data

(60) Provisional application No. 61/576,747, filed on Dec. 16, 2011.

(51) Int. Cl.
| | | |
|---|---|---|
| *B01J 29/068* | (2006.01) | |
| *B01J 29/74* | (2006.01) | |
| *B01J 37/00* | (2006.01) | |
| *B01J 37/08* | (2006.01) | |
| *B01J 37/02* | (2006.01) | |
| *C10G 47/20* | (2006.01) | |
| *B01J 29/06* | (2006.01) | |
| *B01J 29/70* | (2006.01) | |
| *B01J 35/00* | (2006.01) | |
| *B01J 23/44* | (2006.01) | |
| *B01J 35/02* | (2006.01) | |
| *B01J 21/06* | (2006.01) | |
| *B01J 35/10* | (2006.01) | |

(52) U.S. Cl.
CPC .............. *B01J 29/06* (2013.01); *B01J 23/44* (2013.01); *B01J 29/7034* (2013.01); *B01J 29/7469* (2013.01); *B01J 35/0006* (2013.01); *B01J 35/0026* (2013.01); *B01J 35/023* (2013.01); *B01J 37/0009* (2013.01); *B01J 37/0201* (2013.01); *C10G 47/20* (2013.01); *B01J 21/063* (2013.01); *B01J 35/1014* (2013.01); *B01J 35/1023* (2013.01); *B01J 2229/16* (2013.01); *B01J 2229/37* (2013.01); *B01J 2229/42* (2013.01)

(58) Field of Classification Search
CPC ...... B01J 29/06; B01J 21/063; B01J 2229/16; B01J 2229/36; B01J 2229/37; B01J 2229/42; B01J 23/44; B01J 29/7034; B01J 29/7469; B01J 35/0006; B01J 35/0026; B01J 35/023; B01J 35/1014; B01J 35/1023

USPC ................ 208/111.1, 135; 502/74, 77
See application file for complete search history.

(56) References Cited

U.S. PATENT DOCUMENTS

| | | | |
|---|---|---|---|
| 3,140,251 A | 7/1964 | Plank et al. | |
| 3,140,253 A | 7/1964 | Plank et al. | |
| 3,832,449 A | 8/1974 | Rosinski et al. | |
| 4,205,053 A | 5/1980 | Rollmann et al. | 423/329 |
| 4,391,785 A | 7/1983 | Rosinski et al. | 423/329 |
| 4,452,769 A | 6/1984 | Chu et al. | 423/329 |
| 4,482,531 A | 11/1984 | Kuehl | 423/329 |
| 4,539,193 A | 9/1985 | Valyocsik | 423/328 |
| 4,552,738 A | 11/1985 | Rubin | 423/328 |
| 4,552,739 A | 11/1985 | Kuhl | 423/328 |
| 4,585,637 A | 4/1986 | Rubin | 423/328 |
| 4,585,746 A | 4/1986 | Valyocsik | 502/62 |
| 4,599,162 A | 7/1986 | Yea | |
| 4,741,891 A | 5/1988 | Casci et al. | |
| 4,753,910 A | 6/1988 | Han et al. | |
| 4,836,996 A | 6/1989 | Casci et al. | |
| 4,876,412 A | 10/1989 | Casci et al. | |
| 5,021,141 A | 6/1991 | Rubin | 208/46 |
| 5,075,259 A | 12/1991 | Moran | |
| 5,075,269 A | 12/1991 | Degnan et al. | |
| 5,080,878 A | 1/1992 | Bowes et al. | |
| 5,098,685 A | 3/1992 | Casci et al. | |
| 5,157,191 A | 10/1992 | Bowes et al. | |
| 5,192,521 A | 3/1993 | Moini et al. | 423/713 |
| 5,234,872 A | 8/1993 | Apelian et al. | |
| 5,242,676 A | 9/1993 | Apelian et al. | |
| 5,430,000 A | 7/1995 | Timken | |

(Continued)

FOREIGN PATENT DOCUMENTS

| | | |
|---|---|---|
| CN | 1703493 | 11/2005 |
| CN | 1989089 | 6/2007 |

(Continued)

OTHER PUBLICATIONS

Database of Zeolite Structures, Framework Type MTW, 2007, Structure Commission of International Zeolite Association.*
Porter, et al., The effect of calcination on the microstructural characteristics and photoreactivity of Degussa P-25 TiO2, Journal of Materials Science, vol. 34, 1999, pp. 1523-1531.*
Sigma-Aldrich, Titanium Oxide Spec. Sheet, p. 1.*
International Search Report dated Feb. 27, 2013 for case TS2712-PCT, Application No. PCT/US2012/069438.

(Continued)

*Primary Examiner* — Renee Robinson
*Assistant Examiner* — Derek Mueller
(74) *Attorney, Agent, or Firm* — Charles W. Stewart

(57) ABSTRACT

Presented is a composition useful in the catalytic dewaxing of a waxy hydrocarbon feedstock. The composition includes a mixture of ZSM-12 zeolite and titania and may further include a noble metal. The ZSM-12 zeolite preferably has a high silica-to-alumina ratio within its framework. The mixture may be dealuminated either by acid leaching using a fluorosilicate salt or by steam treating.

16 Claims, No Drawings

(56) References Cited

U.S. PATENT DOCUMENTS

| | | |
|---|---|---|
| 5,804,058 A | 9/1998 | Grandvallet et al. |
| 5,993,642 A | 11/1999 | Mohr et al. |
| 6,576,120 B1 | 6/2003 | Van Ballegoy et al. |
| 6,652,832 B2 | 11/2003 | Malek ............................ 423/706 |
| 6,893,624 B2 | 5/2005 | Lai et al. ....................... 423/705 |
| 6,923,949 B1 | 8/2005 | Lai et al. |
| 7,077,948 B1 | 7/2006 | Barre et al. .............. 208/111.35 |
| 7,261,805 B2 | 8/2007 | Grove et al. |
| 9,029,283 B2 | 5/2015 | Berg-Slot et al. |
| 2004/0082461 A1 | 4/2004 | Remans et al. |
| 2009/0166252 A1 | 7/2009 | Daage et al. |
| 2009/0176643 A1 | 7/2009 | Elia et al. |
| 2009/0186754 A1 | 7/2009 | Elia et al. |
| 2010/0298187 A1 | 11/2010 | Germaine et al. |
| 2011/0118520 A1 | 5/2011 | Lai et al. |

FOREIGN PATENT DOCUMENTS

| | | | | |
|---|---|---|---|---|
| EP | 2075314 | 1/2009 | | |
| GB | 2077709 | 12/1981 | | |
| RU | 2177468 | 12/2001 | | |
| WO | 1996041849 | 12/1996 | | |
| WO | WO96/41846 | * 12/1996 | ............ | C10G 45/64 |
| WO | 2000029512 | 5/2000 | | |
| WO | 2005092792 | 10/2005 | | |
| WO | 2007070521 | 6/2007 | | |
| WO | 2009016143 | 2/2009 | | |
| WO | 2010053468 | 5/2010 | | |
| WO | 2012055755 | 3/2012 | | |
| WO | 2012055759 | 3/2012 | | |
| WO | 2013090534 | 6/2013 | | |

OTHER PUBLICATIONS

Porter, J.F. et al., "The Effect of Calcination on the Microstructural Characteristics and Photoreactivity of Degussa P-25 Tio2", Journal of Materials Science, vol. 34, 1999, pp. 1523-1531.

PCT International Search Report dated Mar. 6, 2013 for Application No. PCT/US2012/069438, filed Dec. 13, 2012.

* cited by examiner

ANATASE POLYMORPH TITANIA-BOUND ZSM-12 ZEOLITE COMPOSITION AND METHOD OF MAKING AND USING SUCH COMPOSITION

This application claims the benefit of U.S. Provisional Application No. 61/576,747 filed Dec. 16, 2011, the entire disclosure of which is hereby incorporated by reference.

This invention relates to a titania-bound zeolite composition that is useful as a component of or as a catalyst for the dewaxing of a hydrocarbon oil feed, the preparation of the composition, and use of the composition in the processing of hydrocarbon oil feedstocks.

A crystalline zeolite designated ZSM-12 is described in U.S. Pat. No. 3,832,449. ZSM-12 zeolites are indicated in the '449 patent as having catalytic characteristics and to be useful in petroleum refining processes that include processes for the reduction of the pour point of paraffinic charge stocks and the isomerization of n-paraffins and naphthenes.

In U.S. Pat. No. 7,077,948 is disclosed a catalytic dewaxing process for lowering the pour point or cloud point of an oil feed by selectively converting its components having a high pour point to ones having a lower pour point. The catalyst used in this dewaxing process comprises a hydrogenation component, a surface dealuminated aluminosilicate zeolite crystallite and a low acidity refractory oxide binder material that is essentially free of alumina. The list of possible suitable aluminosilicate zeolite crystallites includes ZSM-12 and ZSM-48. The preferred aluminosilicate zeolites are those having an MFI topology such as ZSM-5 zeolite. It is preferred for the crystallites to be smaller than 10 microns. The low acidity referactory oxide binder material is essentially free of alumina and may include silica, zirconia, titanium dioxide, germanium dioxide, boria and mixtures of two or more thereof. The most preferred binder is silica. The dealumination may be performed using an aqueous solution of a fluorosilicate salt. The hydrogenation component may be nickel, cobalt, platinum or palladium.

US Pub. No. U.S. Pat. No. 2009/0186754 discloses a dewaxing catalyst that has a relatively high activity as compared to other dewaxing catalysts when used in the treatment of feeds having high levels of either sulfur or nitrogen. The dewaxing catalyst comprises a zeolite with a low silica-to-alumina ratio and having a high ratio of zeolite surface area to external surface area, a low surface area binder, and a metal hydrogenation component. The zeolite is selected from those that provide for dewaxing by isomerization of hydrocarbon feedstocks, but the zeolite more preferably selected from those having a unidimensional pore structure. Suitable zeolites are those having 10-member ring structures including EU-2, ZSM-23 and ZSM-48 zeolites. The preferred silica-to-alumina ratio of the zeolite is 100:1 or less. The low surface area binder has a surface area of 100 $m^2/g$ or less. The metal hydrogenation component of the dewaxing catalyst may be selected from Groups 6-12 of the Periodic Table (based on IUPAC system) and the binder material may be metal oxides such as alumina, silica, titania, zirconia, and silica-alumina. Certain exemplified catalysts include extrudates of ZSM-48 and titania or silica loaded with platinum. There is no indication that these catalysts are dealuminated.

There are ongoing efforts to provide improved catalysts for use in the catalytic dewaxing of hydrocarbon feedstocks. Such improvements may include dewaxing catalysts having enhanced activity or which provide for improved lube stock yields when processing certain hydrocarbon feedstocks.

Accordingly, provided is an inventive composition that comprises a mixture that comprises titania and a ZSM-12 zeolite. Also provided is a process for the catalytic dewaxing of a hydrocarbon oil feeds. This process comprises contacting, under catalytic dewaxing conditions, the hydrocarbon oil feed with a catalyst composition comprising a mixture comprising titania and a ZSM-12 zeolite and a noble metal selected from the group of noble metals consisting of platinum and palladium. Further provided is a method of preparing a dewaxing catalyst composition. This method comprises mixing a ZSM-12 zeolite with titania and then forming the mixture into a particle that may further be treated and impregnated with a noble metal to thereby provide a dewaxing catalyst.

The composition of the invention is useful in the catalytic dewaxing of waxy hydrocarbon feedstocks, and it exhibits exceptional catalytic activity for the isomerization of normal paraffins to isoparaffins while still providing for a high base oil yield. In general, the inventive composition comprises a mixture of a titanium dioxide ($TiO_2$) binder and a ZSM-12 zeolite. The mixture of the composition may further include a noble metal component, such as platinum or palladium, that is incorporated into the mixture. The zeolite component of the mixture may also be dealuminated.

The ZSM-12 zeolite is known in the patent literature with one early patent, U.S. Pat. No. 3,832,449, providing a detailed description of the zeolite composition, its physical properties and a method of preparing the ZSM-12 zeolite. This patent is incorporated herein by reference.

In subsequent disclosures of the patent literature are many other types and variations in the method of preparing or synthesizing the ZSM-12 type zeolite. Numerous of these methods utilize various types of directing or templating agents in the synthesis of the ZSM-12 zeolite. Some of these different methods are described in such patents as U.S. Pat. No. 4,205,053; U.S. Pat. No. 4,391,785; U.S. Pat. No. 4,482,531; U.S. Pat. No. 4,452,769; U.S. Pat. No. 4,539,193; U.S. Pat. No. 4,552,738; U.S. Pat. No. 4,552,739; U.S. Pat. No. 4,585,637; U.S. Pat. No. 4,585,746; U.S. Pat. No. 5,021,141; U.S. Pat. No. 5,192,521; U.S. Pat. No. 6,652,832, and US Pub. No. US 2011/0034759, all of which are incorporated herein by reference. Also, other patent references disclose ZSM-12 type zeolites that have different physical properties or that are in a form other than those disclosed in much of the earlier patent literature. Examples of these references include U.S. Pat. No. 6,893,624 and US Pub. No. US 2011/0118520, which are also incorporated herein by reference.

As may be recognized from the teachings within the patents listed above, the ZSM-12 zeolite component of the inventive composition has a known structure that is well defined, and it may be prepared by a variety of the known methods for making such ZSM-12 zeolites.

One important feature of the inventive composition is for the ZSM-12 zeolite component to have a silica-to-alumina ratio that is sufficiently high to provide for a final dewaxing catalyst of the invention that exhibits desired catalytic properties of high activity while providing for a high yield. To provide for this, the ZSM-12 zeolite component should have a silica-to-alumina ratio (also referred to sometimes herein as "SAR") that is at least 50:1. Preferably, the SAR greater than 70:1, or greater than 75:1, or greater than 85:1 or even greater than 100:1.

In more preferred embodiments of the invention, the SAR of the ZSM-12 zeolite component has a silica-to-alumina ratio that significantly exceeds 100:1, such as more than 110:1 or more than 125:1, or more than 150:1. An upper limited to the SAR of the ZSM-12 zeolite component can be less 1000:1, but, more typically, the upper limit of the SAR of the ZSM-12 zeolite component is less than 500:1. The silica-to-alumina ratio (SAR), as the term is used herein, references the molar ratio of silica and alumina contained in the framework of the zeolite.

If the as-synthesized ZSM-12 zeolite already has a sufficiently high SAR that it provides for the desired catalytic properties of the final catalyst composition of the invention, then there is no need to acid leach or steam treat the zeolite in order to thereby dealuminate it. However, if the SAR of the as-synthesized ZSM-12 zeolite is too low, it may further be either acid leached or steam treated so as to thereby dealuminate the zeolite to provide a dealuminated ZSM-12 zeolite having the desired high silica-to-alumina ratio that can be used as a component of the inventive composition. Thus, in preparing the inventive composition, the ZSM-12 zeolite may be dealuminated either by acid leaching or by steam treating before it is mixed with the titania binder component of the inventive composition. Or, alternatively, the ZSM-12 zeolite may be dealuminated after it has been mixed with the titania binder component of the inventive composition so as to provide a treated mixture of ZSM-12 zeolite and titania.

It is a preferred embodiment of the invention to either acid treat or steam treat the ZSM-12 zeolite component after it has been mixed and combined with the titania binder material and formed into an agglomerate or particle that has been calcined to provide a calcined particle. The steam treatment is effected by contacting the zeolite, preferably the calcined particle of the mixture of zeolite and titania, with steam at an elevated temperature in the range of from 250° C. to 650° C., and, preferably, in the range of from 400° C. to 550° C. The steam treatment can be accomplished in an atmosphere of 100% steam or in an atmosphere consisting of steam or some other gas which is essentially inert to the zeolite. A similar treatment can be accomplished at lower temperatures and elevated pressure, e.g., from 180° C. to 370° C. at from 10 to 200 atmospheres.

It is particularly preferred to use an acid treatment method to dealuminate the ZSM-12 zeolite component of the inventive composition. Among the available methods of acid treatment the most preferred is a dealumination process which comprises contacting the zeolite with a solution of a fluorosilicate salt wherein the fluorosilicate salt is represented by the formula:

$$(A)_{2/b}SiF_6$$

wherein 'A' is a metallic or non-metallic cation other than $H^+$ having the valence 'b'. Examples of cations with the valence 'b' are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation.

The solution comprising the fluorosilicate salt preferably is an aqueous solution. The concentration of the salt preferably is at least 0.004 mole of fluorosilicate salt/liter, more preferably, the salt concentration is at least 0.006 mole of fluorosilicate salt/liter, and, most preferably, it is at least 0.008 mole of fluorosilicate salt/liter. The concentration preferably is at most 0.5 mole of fluorosilicate salt/l, more preferably at most 0.3 mole of fluorosilicate salt/liter, and, most preferably, at most 0.1 mole of fluorosilicate salt/liter.

The weight ratio of fluorosilicate salt solution to the zeolite used in the treatment of the zeolite is in the range of from 50:1 to 1:4 of fluorosilicate solution to zeolite. If the zeolite is present together with binder, the binder is not taken into account for these weight ratios.

The pH of the aqueous fluorosilicate containing solution preferably is in the range of from 2 and 8, and, more preferably, in the range of from 3 and 7.

The ZSM-12 zeolite or ZSM-12 zeolite-containing material or calcined particle comprising ZSM-12 zeolite and titania is contacted with the fluorosilicate salt solution for a time period sufficient to provide a desired dealuminated ZSM-12 zeolite having an SAR within the desired range. Typically, the contacting time period is in the time range of from 0.5 hours to 20 hours. A more specific contacting time period is in the range of from 1 to 10 hours.

The temperature at which the fluorosilicate salt solution is contacted with the ZSM-12 zeolite or ZSM-12 zeolite-containing material or calcined particle comprising ZSM-12 zeolite and titania is in the range of from 10° C. to 120° C., and, more specifically, of from 20° C. to 100° C.

Titanium dioxide ($TiO_2$), also referred to herein as titania, is an important and significant component of the inventive composition. The titania component of the invention may be in any one or a combination or mixture of its several forms or polymorphs of rutile, anatase or brookite. The titania may be present in the pure form of any one of the polymorphs, but, if the titania present in the inventive composition is in other than a pure form, i.e., 100 percent of a specific titania polymorph, it typically is in the anatase form in an amount exceeding 50 wt % with the balance being either the rutile form or brookite form or a combination of both such forms.

In the more desirable compositions of the invention, the balance of the titania that is not in the anatase form is predominantly in the rutile form. It is preferred for the titania component to comprise, consist essentially of, or consist of more than 60 wt % anatase titania and less than 40 wt % rutile titania. In a more preferred composition, the titania component should contain at least 70 wt % up to 100 wt % anatase titania, but, most preferably, the titania component of the inventive composition contains titania having at least 75 wt % or at least 80 wt % up to 100 wt % of the anatase form of titania. Good results have been achieved using titania having in excess of 70 wt % anatase titania and 100 wt % anatase titania.

It is a desirable feature of the invention for the titania component of the inventive composition to contain a low concentration of silica ($SiO_2$), especially, a low concentration of amorphous silica, but, also, a low concentration of crystalline silica other than the zeolite itself, if present in the titania component. Thus, the titania component has a material absence of silica or a substantial absence of silica, generally, an amount of less than 5 wt % silica. Thus, the titania component can contain less than 3 wt % silica, but, it is more preferred that it contains less than 1 wt % silica. In the most preferred compositions of the invention, the titania component can have less than 0.1 wt % silica or even less than 0.05 wt % silica.

It can also be desirable for the titania component of the inventive composition to have a low concentration of alumina ($Al_2O_3$). Generally, the titania component contains less than 5 wt % alumina. It is preferred for the titania component to have a material absence of alumina or a substantial absence of alumina. Thus, the titania component can contain less than 3 wt % alumina, but, it is more preferred that it contains less than 1 wt % alumina.

When referring herein to the material absence of a compound, what is meant is that the referred to compound is absent in an amount such that the component does not affect the basic properties of the composition as they are defined herein, such as, for example, the catalytic and physical properties of the inventive catalyst composition which contains the component.

Very suitable titania starting materials are available from Millenium Chemicals, Degussa and Haishunde. For example, Millenium's DT-51D and G5 grades; Degussa's P25 grade; and Haishunde's grade FCT010925.

The B.E.T surface area of the titania utilized is suitable in the range of from 10 m$^2$/g to 700 m$^2$/g, but, more preferably, it is in the range of from 20 m$^2$/g to 400 m$^2$/g.

The ZSM-12 zeolite content of the final composition of the invention should be at least 10 wt % and at most 70 wt % of the total dry weight of the composition. The titania content of the final composition of the invention can be in the range of from at least 30 wt % and no more than 90 wt % of the total dry weight of the composition.

It is preferred for the ZSM-12 zeolite content of the composition to be at most 60 wt %, and, more preferred, at most 55 wt %. It is further preferred for the ZSM-12 zeolite content of the composition to be at least 20 wt %, but, more preferred, at least 25 wt %, and, most preferred, at least 30 wt %.

The titania content of the composition, on the other hand, can be at least 40 wt %, or, even, at least 45 wt %. It is preferred for the titania content of the composition to be no more than 80 wt %, but, more preferred, no more than 75 wt %, and, most preferred, no more than 70 wt %.

In another embodiment of the inventive composition, the mixture, which may be in the form of a particle, comprising ZSM-12 zeolite and titania, further may be treated by any of the methods referenced herein to dealuminate zeolite itself and to provide a treated mixture that comprises the dealuminated mixture and further comprises dealuminated ZSM-12 zeolite.

It is, therefore, desirable for the mixture to have a low concentration of silica, and, in particular, the mixture should have a material absence of silica (other than silica contained in the ZSM-12 zeolite framework) or, preferably, a substantial absence of silica (other than silica contained in the ZSM-12 zeolite framework). Thus, generally, the mixture contains an amount of silica that is less than 5 wt % of the total dry weight of the mixture, and the mixture can contain less than 3 wt % silica. It is more preferred for the mixture to contain less than 1 wt % silica, and, it is most preferred for the mixture to contain less than 0.1 wt % silica or even less than 0.05 wt % silica.

It is understood that the reference herein to the wt % silica of the mixture or the reference to the amount, concentration, or absence of silica that is contained in the mixture both exclude or is a reference to the silica other than the silica that is contained in the ZSM-12 zeolite framework itself.

It is further desirable for the treated or untreated mixture of ZSM-12 and titania of the inventive composition to have a low concentration of alumina (other than the alumina contained in the ZSM-12 zeolite framework) that is generally less than 5 wt % of the total dry weight of the mixture. It is preferred, however, for the mixture to have a material absence of alumina (other than the alumina contained in the ZSM-12 zeolite framework) or a substantial absence of alumina (other than the alumina contained in the ZSM-12 zeolite framework). Therefore, the mixture typically should contain less than 3 wt % alumina, but, more preferably, it contains less than 1 wt % alumina.

It is understood that the reference herein to the wt % alumina of the mixture or the reference to the amount, concentration, or absence of alumina that is contained in the mixture both exclude or is other than the alumina that is contained in the ZSM-12 zeolite framework itself.

The inventive composition may further comprise a noble metal component which is selected from the group of noble metals consisting of palladium and platinum. The preferred noble metal, however, is platinum. The noble metal component is incorporated into the mixture or particle after its treatment or dealumination, if the mixture or particle is subjected to a treatment or a dealumination step, or, otherwise, the noble metal component is incorporated into the untreated mixture or particle.

Any known suitable means or method may be used to incorporate the noble metal component into the mixture or particle, but, one suitable method is by incipient wetness impregnation using a salt solution of the of the noble metal. If platinum is incorporated into the mixture or particle, possible suitable impregnation solutions may include platinum compounds such as chloroplatinic acid ($H_2PtCl_6(H_2O)_6$); platinous chloride ($PtCl_2$); and the various compounds containing the platinum amine complex, e.g. tetramminplatinum nitrate, $Pt(NH_3)_4(NO_3)_2$, or tetrammineplatinum chloride hydrate, $Pt(NH_3)_4Cl_2 \cdot xH_2O$. The mixture or particle is impregnated with the noble metal solution, dried at standard drying conditions, such as, for example, a drying temperature in the range of from 90° C. to 200° C., and, thereafter, calcined at standard calcination conditions, such as, for example, a calcination temperature in the range of from 250° C. to 600° C.

It is desirable for the composition of the invention that comprises the mixture and a noble metal to have a noble metal content in the range of upwardly to about 3 wt % based on the noble metal as an element, regardless of its actual form, and the total dry weight of the composition. It is preferred for the noble metal component to be present in the composition at a concentration in the range of from 0.1 wt % to 3 wt %. More preferably, the noble metal component is present in the composition in an amount in the range of from 0.2 wt % to 2 wt %, and, most preferably, it is in the range of from 0.3 wt % to 1 wt %.

It is further desirable for the composition that contains a noble metal component to also have a material absence of a Group VIII metal other than the noble metal component. The composition that comprises the mixture and a noble metal, therefore, should also have a material absence of a Group VIII metal other than platinum or palladium. Thus, the composition generally should have a cobalt or nickel concentration that is less than 1 wt % of the composition, but it is particularly desirable for the composition to have a substantial absence of such Group VIII metals as cobalt and nickel, which is generally less than 0.1 wt % of the composition or lower.

In the method of preparing or manufacturing the composition of the invention, a mixture comprising the ZSM-12 component and the titania component is prepared by any suitable means or method known to those skilled in the art for mixing or combining the separate components to thereby provide the mixture. The mixture may suitably be prepared by co-mulling a ZSM-12 zeolite powder and a titania powder to form the mixture. Other materials, such as, for example, water, a peptizing agent, or a plasticizing agent, may be mixed with the ZSM-12 and titania components to assist in the formation of an extrudable mass that can be extruded to form the mixture into a particle or extrudates. While other methods of forming the mixture into a particle may be used, extrusion is one of the preferred methods.

The particle that comprises, consists essentially of, or consists of ZSM-12 zeolite and titania undergoes a drying step in order to provide a dried particle. Any suitable conventional means or method known to those skilled in the art for drying particulate compositions can be used in drying the particle. The typical drying conditions can include a drying temperature in the range of from 90° C. to 200° C. The dried particle is then calcined to thereby provide a calcined particle by using any suitable conventional means or method known to those skilled in the art for calcining particulate compositions. Typical calcination conditions include a calcination temperature in the range of from 250° C. to 1000° C., but, preferably, in the range of from 300° C. to 800° C.

The calcined particle may then have incorporated therein a noble metal component, but, in an embodiment of the invention, the calcined particle undergoes a treating step by which it is either steam treated or acid treated by such methods as described in detail above. It is a preferred embodiment of the invention for the calcined particle to be subjected to an acid treating step whereby it is treated with a solution of fluorosilicate salt in the manner described above to thereby provide an acid treated particle that preferably further comprises dealuminated ZSM-12 zeolite.

The acid treated particle is then dried and calcined as described above to provide a catalyst carrier to be loaded with the noble metals as described elsewhere herein. The noble metal is incorporated into the catalyst carrier by the methods as described in detail above to provide a catalyst composition that comprises, consists essentially of, or consists of ZSM-12 zeolite, titania, and noble metal.

The compositions of the invention may have possible application or use as a catalyst in a wide variety of hydrocarbon conversion processes such as in hydrocracking, isomerization, hydrogenation, dehydrogenation, polymerization, reforming, catalytic hydrocracking, toluene disproportionation, and ethylbenzene conversion. Certain of the compositions have been found to be especially suitable for use in catalytic dewaxing applications.

Catalytic dewaxing is used to improve the cold flow properties of distillate hydrocarbon and lubricating base oil feedstocks by selective hydroisomerization or hydrocracking, or both, of the normal and slightly branched paraffins contained in such feedstocks. These reactions result in converting the components of an oil feedstock that have a high melting temperature which imparts a high pour point to the oil feedstock to other components that have a lower melting temperature which imparts a lower pour point to the oil feedstock. The high melting temperature compounds are referred to as waxes. Wax compounds can include, for example, high melting temperature normal paraffins, isoparaffins and mono-ringed compounds. The dewaxing process reduces the pour point of the oil feedstock preferably by at least 10° C., and, more preferably, by at least 20° C.

Suitable hydrocarbon oil feeds to be employed in the process according to the present invention are mixtures of high-boiling hydrocarbons, such as, for instance, heavy oil fractions. It has been found particularly suitable to use vacuum distillate fractions derived from an atmospheric residue, i.e. distillate fractions obtained by vacuum distillation of a residual fraction that is obtained by atmospheric distillation of a crude oil, as the feed. The boiling range of such a vacuum distillate fraction is usually between 300° C. and 620° C., suitably between 350° C. and 580° C. However, deasphalted residual oil fractions, including both deasphalted atmospheric residues and deasphalted vacuum residues, may also be applied. If the vacuum distillate fractions contain substantial amounts of sulphur- and nitrogen-containing contaminants, for example, having sulfur levels of up to 3% by weight and nitrogen levels up to 1% by weight, it may be advantageous to treat this feedstock by a hydrodesulfurization and hydrodenitrogenation step prior to the catalytic dewaxing process according to the present invention.

Dewaxing generally comprises contacting feedstock with a catalyst composition according to the present invention at a temperature of up to 450° C., more specifically of from 250° C. to 400° C., but, preferably, of from 275° C. to 350° C., and at a total pressure of from 5 to $200 \times 10^5$ Pa, more specifically of from 15 to $170 \times 10^5$ Pa, preferably of from 25 to $150 \times 10^5$ Pa. The liquid hourly space velocity preferably is in the range of from 0.1 to 10 $h^{-1}$.

The feedstock to be subjected to dewaxing is, preferably, either a gas oil or a lube oil basestock, but, more preferably, it is a lube oil base stock. Among these feedstocks, it is preferred for them to be wax-containing feeds that boil in the lubricating oil range typically having a 10% distillation point at 200° C. or higher as measured by ASTM D-2887-93. Examples of feeds having relatively high amounts of waxy compounds are synthetic waxy raffinates (Fischer-Tropsch waxy raffinates), hydrocracker bottom fractions (hydrowax), i.e. those fractions having a final boiling point of at least 320° C., preferably at least 360° C. and slack waxes obtained from the dewaxing of hydroprocessed or solvent refined waxy distillates. These feeds have a wax content of at least 50% by weight, preferably at least 80% by weight and more preferably at least 90% by weight. The wax content is provided by the compounds contained in the feed which are plastic at ambient temperature and melt above 45° C. to give a low viscosity liquid. The amount of wax can be determined by the ASTM method D3235. The process of the present invention can be used to prepare lubricating base oils having viscosity indices (VI) above 120 and particularly above 135.

Furthermore, the feedstocks may have been hydrotreated and/or hydrocracked before being subjected to dewaxing. Hydrotreating generally involves contacting feedstock with a hydrotreating catalyst at a temperature of up to 500° C., more specifically of from 250 to 500° C., and a hydrogen partial pressure of from 10 to $200 \times 10^5$ Pa, more specifically of from 30 to $130 \times 10^5$ Pa.

Hydrocracking generally involves contacting feedstock with a hydrocracking catalyst at a hydrogen partial pressure (at the reactor inlet) in the range from $3 \times 10^6$ to $2.9 \times 10$ Pa, more preferably from $8 \times 10$ to $1.75 \times 10^7$ Pa and a ratio of hydrogen gas to feedstock (total gas rate) in the range from 100 to 5000 Nl/kg, but preferably in the range from 200 to 3000 Nl/kg.

The following examples are presented only to illustrate certain aspects of the invention, but they are not intended to in any way be limiting.

EXAMPLE I

This Example I describes the preparation of the comparative Composition A (ZSM-12/silica) and the inventive Compositions B and C (ZSM-12/titania).

Composition A (Comparison)

An extrudable mass was prepared by combining 25 wt % ZSM-12 zeolite having a SAR of 90, 50 wt % of amorphous precipitated silica powder (Sipernat-50 as obtained from Degussa) and 25 wt % of an ammonium stabilized commercially available silica sol (sold under the trade name Bindzil $30NH_3/220$ by Eka Chemicals). The weight amounts are basis dry components. The mass was extruded to give extrudates having a cylinder shape and an average diameter of 1.6 mm. These extrudates were dried at 120° C. and calcined at 625° C. for 1 hour resulting in white calcined extrudates.

These extrudates were treated unstirred at a temperature of 90° C. for 5 hours with 0.02 M aqueous ammonium hexafluorosilicate (AHS) solution. The weight ratio of solution to extrudates was 5:1. Subsequently, the extrudates were separated from the solution, washed with deionized water, and dried at 120° C. for 2 hours followed by calcination at 500° C. for 1 hour.

Thereafter, 0.7% wt/wt platinum was incorporated into the composition by pore volume impregnation during about 10 minutes with an aqueous solution containing tetramine platinum nitrate ($Pt(NH_3)_4(NO_3)_2$) (3.37% w/w Pt).

The impregnated composition was not washed, but equilibrated during 1.5 hours on a rolling bed, dried for 10 minutes at 180° C. (temperature incrementally increased at a rate of 15° C./minute). The temperature was raised again at an incremental rate of 30° C./minute to 290° C. (internal 270° C.) and held stable during 12 minutes. Then, the catalyst was cooled down to room temperature.

Composition B (ZSM-12 Zeolite and Titania)

An extrudable mass was prepared by combining 25 wt % ZSM-12 having a SAR of 90 and 75 wt % 100% anatase titania powder sold by Millenium Specialty Chemicals Inc. identified as Millenium's G5 grade titania having a nitrogen B.E.T. surface are of 293 m$^2$/g and a bulk density of 0.56 g/ml. The weight amounts are basis dry components. The mass was extruded to give extrudates having a cylinder shape and an average diameter of 1.6 mm. These extrudates were dried at 120° C. and calcined at 625° C. for 1 hour to provide calcined extrudates.

These extrudates were treated unstirred at a temperature of 90° C. for 5 hours with 0.02 M aqueous ammonium hexafluorosilicate (AHS) solution. The weight ratio of solution to extrudates was 5:1. Subsequently, the extrudates were separated from the solution, washed with deionized water, and dried at 120° C. for 2 hours followed by calcination at 500° C. for 1 hour.

Thereafter, 0.7% wt/wt platinum was incorporated into the composition by pore volume impregnation during about 10 minutes with an aqueous solution containing tetramine platinum nitrate ($Pt(NH_3)_4(NO_3)_2$) (3.37% w/w Pt).

The impregnated composition was not washed, but equilibrated during 1.5 hours on a rolling bed, dried for 10 minutes at 180° C. (temperature incrementally increased at a rate of 15° C./minute). The temperature was raised again at an incremental rate of 30° C./minute to 290° C. (internal 270° C.) and held stable during 12 minutes. Then, the catalyst was cooled down to room temperature.

Composition C (ZSM-12 Zeolite and Titania)

This composition was prepared in the same manner as described above for Composition B with the exception that the titania powder is Degussa (Evonik) P25 80 wt % anatase and 20 wt % rutile titania.

EXAMPLE II

This Example II describes the performance testing of the compositions of Example I in the catalytic dewaxing of a waxy raffinate feed and presents the results thereof.

The catalyst under scrutiny was dried at 250° C. for 3 hours. Subsequently, the catalyst was mixed with sufficient inert material to assure proper plug flow conditions and loaded into a single tube test reactor of down flow mode. Subsequently, a hydrogen partial of 40 bar was applied and the temperature was increased from room temperature to 125° C. at a rate of 20° C./h, and held for two hours. The temperature was then increased further to 300° C. at a rate of 50° C./h, and held for 8 hours to ensure proper reduction of the metallic phase.

The reactor was cooled to 200° C. and then the feed having the properties presented in Table 1 was introduced at a weight hourly space velocity of 1.0 kg feed per liter catalyst per hour, together with hydrogen at a rate of 500 Nl per kg of feed. After feed break through, the temperature was increased to 250° C. in 4 hours, and held overnight. The temperature was then adjusted to obtain a liquid product cloud point of −30° C. The cloud points were measured according to ASTM D 2500.

The performance of catalysts A, B and C is shown in Table 2. The expression % w of stands for the weight percent on feed, 400° C.+ stands for product having a boiling point above 400° C. measured according to ASTM D-2887. The yield of 400° C.+ product can be considered equivalent to the base oil yield. $T_{req}$ is the temperature required to reach the target liquid product cloud point of −30° C.

TABLE 1

| Feed Properties | | |
|---|---|---|
| Feed | | |
| Density at 70/4° C. | g/ml | 0.7844 |
| Carbon content | % w | 85.28 |
| Hydrogen content | % w | 14.72 |
| Sulphur content, | ppmw | <10 |
| Nitrogen content, | ppmw | <1 |
| UV Mono-aromatics Aromatics | mmol/100 g | 0.30 |
| Pour Point | °C. | +48 |
| Cloud Point | °C. | +56 |
| TBP-GLC | | |
| 0.5% w recovery (IBP) | ° C. | 289 |
| 10% w recovery | ° C. | 405 |
| 50% w recovery | ° C. | 461 |
| 90% w recovery | ° C. | 520 |
| 98% w recovery | ° C. | 548 |
| 99.5% w recovery | ° C. | 567 |

TABLE 2

| | Catalyst Performance Results | | | |
|---|---|---|---|---|
| | nC7 to iC7 @ 40% conv. | | Bintulu WR @ TLP PP = −30° C. | |
| Catalyst | $T_{req}$ (° C.) | $T_{req}$ (° C.), no AHS | $T_{req}$ (° C.) | Yield 400° C.+ (% wof) |
| A | 302 | — | 316 | 71.3 |
| B | 289 | 276 | 302 | 70.7 |
| C | 287 | 277 | 300 | 67.4 |

As may be seen from the data presented in Table 2, the Catalysts B and C with the titania binder exhibits significantly better catalytic dewaxing activity than the comparative Catalyst A that uses a silica binder with the activity gain being 13 to 15° C. It is theorized that an interaction between the silica and zeolite of Catalyst A in some way impacts the catalytic activity of the composition.

What is claimed is:

1. A dewaxing catalyst composition, comprising: a calcined particle, consisting essentially of ZSM-12 zeolite having a silica-to-alumina ratio of at least 50:1 and titania powder in an amount exceeding 50% anatase titania with the balance being in either in a rutile form or a brookite form or a combination of both forms and having a surface area in the range of from 10 m$^2$/gm to 700 m$^2$/gm, that is either acid treated or steam treated; and a noble metal component selected from the group of noble metals consisting of platinum and palladium that is incorporated into said particle after said acid treatment or said steam treatment at a noble metal concentration in the range upwardly to about 3 wt. % based on the noble metal as an element and the total dry weight of said dewaxing catalyst composition.

2. A dewaxing catalyst composition as recited in claim 1, wherein said ZSM-12 zeolite is present in said dewaxing catalyst composition in an amount of at least 10% wt. and at most 70% wt. and said titania is present in said dewaxing catalyst composition in an amount of at least 30% wt. and no more than 90% wt., with such % wt. being based on the dry weight of said composition.

3. A dewaxing catalyst composition as recited in claim 2, wherein said calcined particle is treated with an acid solution to thereby provide dealuminated ZSM-12 zeolite.

4. A dewaxing catalyst composition as recited in claim 3, wherein said ZSM-12 zeolite has a silica-to-alumina ratio greater than 70:1.

5. A dewaxing catalyst composition as recited in claim 1, wherein said ZSM-12 zeolite has a silica-to-alumina molar ratio greater than 70:1.

6. A dewaxing catalyst composition as recited in claim 1, wherein said calcined particle is substantially free of silica other than the silica contained in the ZSM-12 zeolite framework.

7. A dewaxing catalyst composition as recited in claim 1, wherein said mixture calcined particle is substantially free of alumina other than the alumina contained in the ZSM-12 zeolite framework.

8. A dewaxing catalyst composition as recited in claim 1, wherein said titania has a substantial absence of silica.

9. A dewaxing catalyst composition as recited in claim 1, wherein said titania has a substantial absence of alumina.

10. A dewaxing composition as recited in claim 3, wherein the acid treatment of said calcined particle with said acid solution comprises contacting said calcined particle with an aqueous solution of a fluorosilicate salt of the formula $(A)_{2/b}SiF_6$, wherein A is a metallic or non-metallic cation other than $H^+$ having a valence of b.

11. A dewaxing composition as recited in claim 10, wherein said aqueous solution has a pH in the range of from 2 to 8.

12. A dewaxing composition as recited in claim 11, wherein the acid treatment includes contacting said calcined particle with said aqueous solution for a contacting time period in the range of from 0.5 hours to 20 hours and at a contacting temperature in the range of from 20° C. to 100° C.

13. A process for the catalytic dewaxing of a hydrocarbon oil feed, wherein said process comprises: contacting under catalytic dewaxing conditions said hydrocarbon oil feed with the composition of claim 1.

14. A method for preparing a dewaxing catalyst composition, wherein said method comprises: preparing a formed particle that is dried and calcined to provide a calcined particle consisting essentially of ZSM-12 zeolite having a silica-to-alumina ratio of at least 50:1 and titania powder in an amount exceeding 50% anatase titania with the balance being in either in a rutile form or a brookite form or a combination of both forms and having a surface area in the range of from 10 $m^2$/gm to 700 $m^2$/gm; and treating said calcined particle with either steam or an acid solution to thereby provide a treated particle comprising dealuminated zeolite; and incorporating into said treated particle a noble metal selected from the group consisting of platinum and palladium at a noble metal concentration in the range upwardly to about 3 wt. % based on the metal as an element and the total dry weight of said dewaxing catalyst composition.

15. A method as recited in claim 14, wherein the treating of said calcined particle is with an acid solution to thereby provide an acid treated particle comprising dealuminated zeolite.

16. A composition prepared by the method of claim 14.

* * * * *